United States Patent
Picavet

(10) Patent No.: US 11,758,910 B2
(45) Date of Patent: Sep. 19, 2023

(54) DISTRIBUTION OF YEAST OR OTHER FOOD FLUID IN A BAKERY

(71) Applicant: LESAFFRE ET COMPAGNIE, Paris (FR)

(72) Inventor: Florent Picavet, Marcq en Baroeul (FR)

(73) Assignee: LESAFFRE ET COMPAGNIE, Paris (FR)

( * ) Notice: Subject to any disclaimer, the term of this patent is extended or adjusted under 35 U.S.C. 154(b) by 1022 days.

(21) Appl. No.: 16/496,634

(22) PCT Filed: Mar. 23, 2018

(86) PCT No.: PCT/FR2018/050708
§ 371 (c)(1),
(2) Date: Sep. 23, 2019

(87) PCT Pub. No.: WO2018/172716
PCT Pub. Date: Sep. 27, 2018

(65) Prior Publication Data
US 2020/0375199 A1    Dec. 3, 2020

(30) Foreign Application Priority Data

Mar. 23, 2017 (FR) ...................... 17 52432

(51) Int. Cl.
*A21D 8/04*    (2006.01)
*A21C 1/14*    (2006.01)

(52) U.S. Cl.
CPC .............. *A21D 8/047* (2013.01); *A21C 1/146* (2013.01); *A21C 1/1425* (2013.01); *A21C 1/1435* (2013.01); *A21C 1/1495* (2013.01)

(58) Field of Classification Search
CPC .... A21C 1/1425; A21C 1/1435; A21D 8/047; B67D 1/0054
See application file for complete search history.

(56) References Cited

U.S. PATENT DOCUMENTS 6,164,083 A * 12/2000 Leeming .............. B67D 1/0054
                                                           62/201
8,186,545 B2    5/2012 Blomme
2008/0302824 A1    2/2008 Blomme

FOREIGN PATENT DOCUMENTS

EP        0 792 930       9/1997
FR        3 023 125       1/2016
(Continued)

OTHER PUBLICATIONS

Translation of FR 3,023,125 (Year: 2016).*
(Continued)

*Primary Examiner* — Xiao S Zhao
*Assistant Examiner* — John J DeRusso
(74) *Attorney, Agent, or Firm* — NIXON & VANDERHYE

(57) ABSTRACT

Disclosed is a method for distributing a food fluid in a bakery, including the circulation of food fluid from a cold room to at least one metering point, in supply piping arranged between the cold room and the metering point, the cold room being remote from the metering point. The supply piping includes two piping segments and a set of one or more valves, arranged in such a way that: for a first configuration of the set of one or more valves, the two piping segments supply food fluid, in parallel and simultaneously, to the metering point from at least one tank of food fluid located in the cold room, and for at least one other configuration of the set of one or more valves, the two piping segments form a fluid circulation loop.

28 Claims, 7 Drawing Sheets

(56) References Cited

FOREIGN PATENT DOCUMENTS

| GB | 2 309 772 | 8/1997 | | |
|----|-----------|--------|---|---|
| RU | 73 593 U1 | 5/2008 | | |
| RU | 2 371 377 C1 | 10/2009 | | |
| WO | WO 82/00011 | 1/1982 | | |
| WO | WO-9921426 A1 * | 5/1999 | ........... | A21C 1/1425 |
| WO | WO-2010034061 A1 * | 4/2010 | ............ | A21D 8/047 |
| WO | WO 2015/011403 | 1/2015 | | |

OTHER PUBLICATIONS

Smooth-On, "Viscosity Scale Reference Guide", <https://www.smooth-on.com/assets/pdf/Viscosity_Scale_Reference_Guide.pdf> (Year: 2022).*

International Search Report, PCT/FR2018/050708, dated Jun. 26, 2018.

* cited by examiner

DISTRIBUTION OF YEAST OR OTHER FOOD FLUID IN A BAKERY

FIELD OF THE INVENTION

The invention relates to the field of long-distance distribution of yeast or levain in a bakery, when the cold room where the yeast or levain is stored is off-site relative to the mixer where the yeast or levain is used. In place of yeast or levain, or cream yeast or cream levain, another type of fluid leavening agent may be used. Similarly, in place of yeast or levain, another food fluid may be used. Throughout the rest of the text, all mentions concerning yeast can be applied to levain, to another fluid leavening agent, or even to another food fluid, unless otherwise stated. The fluid leavening agent or the food fluid will advantageously be viscous.

BACKGROUND OF THE INVENTION

A liquid yeast distribution system, and in particular a long-distance liquid yeast distribution system, will offer direct metering at the mixer or other metering point to bakers working in bakeries of intermediate size, for example for a semi-industrial bakery or for a large-scale artisanal baker.

The liquid yeast is stored either in refrigerated tanks or in tanks stored in a cooler or a cold room. In the remainder of the text, the expression "cold room" will be used to designate either a cooler or a cold room.

A long-distance liquid yeast distribution system will have to route the liquid yeast automatically to the mixer or to the metering point. Several solutions exist for this.

In a first prior art, loop metering is known in loop metering, the liquid yeast flows through insulated supply piping and then returns to the cold room. This makes it possible to bring the liquid yeast as close as possible to the mixer or metering point, while maintaining the liquid yeast at a homogeneous and relatively cold temperature.

Loop metering requires oversizing the facility, which is then no longer necessarily optimized, and in particular which is then no longer necessarily suitable for an intermediate-sized bakery. Indeed, the high flow rate required to bring the liquid yeast or cream yeast to the metering point implies piping of significant cross-sectional area and/or a circulation pump of significant power. However, for the other operating phases of the facility, namely recooling, recovery, and cleaning, this significant cross-sectional area of the piping and/or this significant power of the circulation pump become oversized.

This first prior art therefore has the disadvantage of being expensive. In particular, for bakeries of relatively modest size, typically corresponding to a limited weekly yeast consumption of less than 1000 liters of yeast per week for example, this cost can be considered too high. In other words, the oversizing of the cross-sectional area of the piping and/or the power of the circulation pump grow increasingly expensive and unnecessary as the size of the bakery decreases.

In a second prior art, feeder line metering is known. In feeder line metering, the liquid yeast is routed to the mixer by insulated piping with no return loop. This lack of a return to the cold room leads to several constraints.

First, a metered quantity of liquid yeast leaving the cold room must be consumed quickly, which implies that the distance of the supply piping between cold room and mixer must not be too great. Otherwise, the yeast that has left the cold room but has not yet been poured at the mixer or metering point will warm up and its quality will decrease as time passes until it becomes inedible after a certain amount of time.

Then, at the end of the day, it is necessary to drain and discard the liquid yeast still present in the supply piping, which results in significant loss of liquid yeast.

However, this second prior art proposes a system which is less expensive than that of the first prior art. This second prior art seems better suited to bakeries of intermediate or reduced size, however.

SUMMARY OF THE INVENTION

The object of the present invention is to provide a yeast distribution device and an associated yeast distribution system that at least partially overcomes the aforementioned disadvantages.

According to the invention, to overcome the disadvantages of the prior art, in particular to overcome both the high cost for the long-distance yeast distribution system of the first prior art and the high level of yeast losses for the long-distance yeast distribution system of the second prior art, the invention proposes, in one configuration, keeping the yeast circulation loop but undersizing it in order to make it useful and profitable, even for bakeries of intermediate size, while creating another configuration in which not only the "infeed" part but this time also the "return" part of the circulation loop are both simultaneously used to supply the yeast metering point. The undersizing of the circulation loop is an undersizing relative to the dimensions required for the supplying of yeast when this is carded out by only one piping portion.

A first advantage lies in the ability to use two piping portions or two piping segments simultaneously to supply a metering point with yeast, which doubles the flow rate of the yeast supply, and which then makes it possible to reduce the cross-sectional area of the piping while satisfying the high level of flow rate required for the supply of yeast to the metering point.

A second advantage lies in being able to circulate non-food and/or food fluid in the circulation loop, through piping of reduced cross-sectional area, which allows ensuring a sufficient flow velocity in the circulation loop while maintaining a power (and size) of the circulation pump that remains reasonable, the relatively high flow velocity required for the circulation loop thus being satisfied with limited pump power.

In summary, to satisfy both the high flow rate required in supply mode and the high velocity required in loop mode, the invention proposes supplying double piping in order to reduce the cross-sectional area of each piping portion while maintaining the high flow rate required in supply mode, which then makes it possible to ensure the high velocity required in loop mode in the circulation loop of reduced cross-sectional area, while maintaining a reasonable power and size of the circulation pump. If the cross-sectional area of the piping is not reduced, the food fluid supply capacity is then doubled. What is interesting is that the total cross-sectional area for the supply of food fluid is significantly increased, doubled here, and this is even more attractive since the supply flow rate is the main parameter for the supply of food fluid, while the flow velocity is the main parameter for the circulation loop.

The transition from supply mode to loop mode, and vice versa, is achieved by a corresponding change in the configuration of a set of one or more valves, advantageously comprising either several simple valves or a single complex valve such as a three-way valve.

This advantageous compromise which allows preserving most of the advantages of long-distance distribution by feeder line as well as most of the advantages of long-distance distribution by loop, can be called "feedloop" long-distance distribution (feeder line and loop).

According to some embodiments of the invention, after a certain amount of time it is possible to cool back down the yeast already taken out of the cold room but not yet discharged at the metering point, and/or to recover at the end of the metering period the yeast already taken out of the cold room but not yet discharged at the metering point, and/or halving the cross-sectional area of the piping which doubles the effectiveness of the compromise between cleaning speed of the piping and power of the circulation pump.

In other uses of the liquid yeast distribution system, the liquid yeast is metered into the supply piping and then pushed by water to the metering point. The water that has been used to push the liquid yeast will therefore be present at the next metering point (timewise), and so on. In this manner, the liquid yeast does not remain in the supply piping for very long. The risk of overheating and the risk of pressure buildup in the supply piping due to the action of liquid yeast that has remained too long in the supply piping, such action facilitated by the increase in temperature of the liquid yeast remaining out of the cold room, are considerably reduced or even virtually eliminated. The insulation of the supply piping, although this may sometimes be retained, is no longer necessary or can be reduced. The method for pushing the water to supply a metering point or a mixer with liquid yeast is known from French patent application FR 1456386, to which reference is made, for more details on this water pushing method. The use of the present invention makes it possible to eliminate this process of pushing with water, thus significantly simplifying the entire yeast distribution system.

According to some embodiments of the invention, the liquid yeast distribution system or long-distance distribution system may have some or all of the following advantages. The amount of time the liquid yeast remains out of the cold room is reduced. The loss of liquid yeast at the end of the day is significantly reduced, if not virtually eliminated, because there is no longer any discarding of the liquid yeast remaining in the supply piping. The liquid yeast distribution system or long-distance distribution system is lighter in weight overall and is less expensive in terms of money. The proposed solution makes it possible to eliminate the constraint created by the distance between the cold room and the metering point. The proposed solution becomes all the more attractive as the number of metering points increases and the distances to the cold room are different, because the amount of liquid yeast likely to remain in the supply piping outside the cold room and the time it remains in the supply piping outside the cold room increase significantly with the number of metering points. Moreover, a significant increase in the total length of the circulation loop, in particular of the circulation loop for cleaning water, makes the reduction in the cross-sectional area of the piping of particular interest, as it enables maintaining a high flow velocity of the fluid, in particular cleaning water, at a reduced power of the circulation pump.

According to some embodiments of the invention, doubling the number of piping segments supplying a metering point with food fluid allows reducing the corresponding head losses, which allows reducing the cross-sectional area of the piping used while maintaining a similar or comparable power of the circulation pump, which allows reducing the cleaning flow rate while maintaining good cleaning quality. Ultimately, the circulation pump, although oversized for cleaning relative to the supplying of food fluid, will still be significantly less oversized with the use of the food fluid distribution method according to the invention.

To this end, the present invention provides a method for distributing food fluid in a bakery, comprising a circulation of food fluid, from a cold room to at least one metering point, in supply piping located between the cold room and the metering point, the cold room being remote from the metering point, characterized in that the supply piping comprises two piping segments and a set of one or more valves arranged so that: for a first configuration of the set of one or more valves, the two piping segments supply the metering point with food fluid, in parallel and simultaneously, from at least one tank of food fluid located in the cold room; and for at least one other configuration of the set of one or more valves, the two piping segments form a fluid circulation loop.

To this end, the present invention also proposes a system for distributing liquid yeast food fluid in a bakery, comprising: a metering point, a cold room remote from the metering point and comprising at least one tank of food fluid, and supply piping arranged between the cold room and the metering point in such a way that food fluid flows from the cold room to the metering point, these being arranged to implement the method for distributing food fluid in a bakery according to the invention.

The system according to the invention may also use the metering point and cold room which are located at the bakery, providing only the liquid yeast distribution device located between the cold room and the mixer. To this end, the present invention also proposes a device for distributing liquid yeast in a bakery, from a distant cold room to a mixer, comprising the entire distribution system but without the metering point or points and without the cold room, possibly also without the food fluid tank or tanks.

According to preferred embodiments, the invention comprises one or more of the following features which can be used separately or in any combination, in particular with one or the other of the aforementioned objects.

Preferably, the fluid circulation loop is a circulation loop for food fluid or non-food fluid. Thus, in a first case, the food fluid can circulate in a loop, in particular in order to be cooled back down or recovered, and in a second case, a cleaning liquid or fluid can circulate in order to clean the pipe after use by the food fluid.

Preferably, the non-food fluid has a viscosity of at most 5 centipoise (cps), preferably at most 2 centipoise (cps), more preferably about 1 centipoise (cps). The very low viscosity of the non-food fluid is to be compared with the intermediate, but much higher viscosity of the food fluid: as this difference in viscosity implies different constraints for the two fluids, food and non-food (a moderate velocity but substantial flow rate for the food fluid and a high velocity for the non-food fluid), the compromise proposed by the invention is all the more attractive and becomes even more attractive when this compromise is to be achieved preferably with the same circulation pump for pumping the food fluid and the non-food fluid.

Preferably, the non-food fluid is cleaning water. The viscosity is very low, and the required flow velocity is high.

Preferably, the food fluid has a viscosity of at least 50 centipoise (cps), preferably at least 100 centipoise (cps), more preferably about 150 centipoise (cps). As already explained above, this intermediate but much higher viscosity of the food fluid compared to the very low viscosity of the non-food fluid renders the compromise proposed by the invention of particular interest.

Preferably, the food fluid is a leavening agent, in other words an agent for causing dough to rise. This leavening agent can therefore be added directly to the dough, for example a floury dough, in order to yield, with water, a bakery product (after subsequent baking), for example bread, pastries, or cake, in a very practical manner, meaning on demand by the baker, without undergoing excessive heating in the event of a long pause, without causing significant waste at the end of the metering cycle, and ensuring proper cleanliness thanks to a simple and effective cleaning between two metering cycles.

Preferably, the food fluid is liquid yeast or cream yeast or liquid levain or cream levain. These are preferred leavening agents.

Preferably, the food fluid is liquid yeast or cream yeast. These are the most preferred leavening agents.

Preferably, the two piping segments and the set of one or more valves are arranged in such a way that, for a second configuration of the set of one or more valves, the two piping segments form a closed circulation loop for food fluid, passing through the tank of food fluid located in the cold room. It is thus possible to cool back down after a certain amount of time the food fluid already outside the cold room but not yet discharged at the metering point, which prevents it from an excessive overheating over time which would degrade the quality of the food fluid, possibly resulting in the loss of the food fluid.

Preferably, the two piping segments and the set of one or more valves are arranged in such a way that, for a third configuration of the set of one or more valves, the two piping segments form an open circulation loop for food fluid which returns the food fluid located in the piping to the cold room, by pushing it with a fluid which is preferably water or air. At the end of the metering period it is thus possible to recover the food fluid already outside the cold room but not yet discharged at the metering point, which avoids the loss of this unused food fluid at the end of the metering period, for example at the end of the week, or for example at the end of the day if the bakery does not operate during the night.

Preferably, the two piping segments and the set of one or more valves are arranged in such a way that, for a fourth configuration of the set of one or more valves, the two piping segments form a closed circulation loop for cleaning water, before this cleaning water is drained, preferably at one or more low points of the piping. It is thus possible to reduce the cross-sectional area of the piping by half, which doubles the efficiency of the compromise between the cleaning speed of the piping and the power of the circulation pump, which allows continuing to thoroughly clean the piping without needing to increase the power of the circulation pump or without needing to increase it by very much.

Preferably, the two piping segments are interconnected at least firstly at a bypass supplying the metering point, secondly at a branch located downstream of a fluid circulation pump but which is not located at a bypass supplying the metering point; the other configuration of the set of one or more valves closing off the direction of said branch, for the return portion of the circulation loop. Thus, in practice by simply adding a branch connecting the two piping segments downstream of a fluid circulation pump and by adding a set of one or more valves to open or close the direction of this branch on the return of the circulation loop, the good compromise according to the invention can be implemented. The modification and the extra cost compared to a conventional long-distance yeast distribution system are minimal for the resulting gain which is significant. In this manner, the change from supply mode to loop mode, and vice versa, is achieved by a corresponding change in the configuration of this set of one or more valves, preferably comprising either two simple valves or one three-way valve.

Preferably, the two piping segments are interconnected at least: firstly at a bypass supplying the metering point, secondly at a branch located downstream of a food fluid circulation pump which upstream is connected to the tank located in the cold room but which is not located at a bypass supplying the metering point; the second configuration of the set of one or more valves and/or the third configuration of the set of one or more valves closing off the direction of said branch, for the return portion of the closed circulation loop and/or for the return portion of the open circulation loop of food fluid towards the cold room. Thus it is the same simple branches and the same simple set of one or more valves that allow changing from food fluid supply mode to food fluid recooling loop mode, as for changing from food fluid supply mode to food fluid recovery loop mode.

Preferably, the two piping segments are interconnected at least firstly at a bypass supplying the metering point, secondly at a branch located downstream of a cleaning water circulation pump which upstream is connected to a cleaning water inlet but which is not located at a bypass supplying a metering point; the fourth configuration of the set of one or more valves closing off the direction of said branch, for the return portion of the closed circulation loop for cleaning water. Thus it is the same simple branches and the same simple set of one or more valves that allow changing from food fluid supply mode to cleaning water circulation loop mode in order to clean the piping before later reuse in food fluid supply mode.

Preferably, the two piping segments are parallel to each other. Thus the overall size of the piping is minimized and the obtained symmetry reduces the impact of the head loss along the segments in parallel and simultaneous supply mode.

Preferably, the circulation of food fluid comprises only one circulation pump. The cost and complexity of the distribution system in general are thus reduced, and the compromise proposed by the invention becomes even more attractive.

Preferably, the circulation of food fluid comprises a circulation pump, and the water inlet or air inlet is located just upstream of this circulation pump. The pressure of the distribution network is thus immediately available at the inlet to the circulation pump, with no head loss. However, it is possible to have the water inlet or air inlet is located just downstream of this circulation pump.

Preferably, the circulation of food fluid occurs, from the cold room to several metering points, in supply piping located between the cold room and the metering points, the cold room being remote from the metering points, the two piping segments and the set of one or more valves being arranged in such a way that: for the first configuration of the set of one or more valves, the two piping segments supply food fluid, in parallel and simultaneously, to several of the metering points, preferably all the metering points, from at least one tank of food fluid located in the cold room; for at least the other configuration of the set of one or more valves, the two piping segments form a single fluid circulation loop. The compromise proposed by the invention is thus even more attractive, because the food fluid distribution system must satisfy even more constraints when the number of metering points is high and the distance from the furthest metering point increases.

Preferably, the two piping segments are interconnected at several respective bypasses supplying the metering points, preferably at all the respective bypasses supplying the metering points. An increasingly large number of metering points can thus benefit from all the advantages of implementing the invention, and here in particular can benefit from the simultaneous parallel double supply. However, it is still possible to make use of this simultaneous parallel double supply at only some of the metering points, or even only one of these metering points, even if this reduces the overall attractiveness of implementing the invention.

Preferably, for the second and/or third configuration of the set of one or more valves, the food fluid circulation loop passing through the cold room is formed: by opening a first valve connecting the return segment to the piping portion leading to the cold room, and by closing a second valve connecting the return segment to the branch. Thus, the simple use of two simple valves having only two states, open or closed, is sufficient to implement the transition from supply mode to loop mode, and vice versa, whether the loop mode is a food fluid recooling loop mode or a food fluid recovery loop mode or a cleaning fluid circulation loop mode.

Preferably, for the second and/or third configuration of the set of one or more valves, the food fluid circulation loop passing through the cold room is formed by changing the state of a three-way valve which: opens the passage between the return segment and the piping portion leading to the cold room, and closes the passage between the return segment and the branch. Thus, the simple use of a single three-way valve, which can theoretically be in four states of which only two are used here (first path open and second path closed, and first path closed and second path open), is sufficient for implementing the transition from supply mode to loop mode and vice versa, whether the loop mode is a food fluid recooling loop mode or a food fluid recovery loop mode or a cleaning fluid circulation loop mode.

Preferably, a temperature sensor is located at the metering point supply bypass furthest from the cold room, where the exceeding of a temperature threshold at this temperature sensor triggers the transition from the first configuration of the set of one or more valves to the second configuration of the set of one or more valves, the temperature threshold preferably being comprised between 1° C. and 7° C., the temperature threshold being even more preferably comprised between 2° C. and 4° C. This temperature sensor is very useful because its presence allows optimizing the frequency of the food fluid recooling operations to whenever necessary but only when necessary. As the most critical point of the distribution system is the metering point supply bypass that is furthest from the cold room (or of course its immediate vicinity), it is necessary and sufficient to place a temperature sensor at that location in order to completely optimize the frequency of the food fluid recooling operations.

Preferably, the same circulation pump is used to circulate the food fluid or the cleaning water in the piping. The overall cost and complexity of the distribution system are thus reduced, and the compromise proposed by the invention becomes even more attractive.

Preferably, the flow velocity of the food fluid remains below 0.7 m/s, preferably below 0.5 m/s, and the flow velocity of the cleaning water remains greater than 1.5 m/s, preferably greater than 2.0 m/s. It is this difference in flow velocity between the food fluid and the non-food fluid which makes it difficult for the distribution system to satisfy the constraints of multimode operation while avoiding oversizing, and which makes the compromise proposed by the invention all the more attractive. Advantageously, the flow velocity of the food fluid remains greater than 0.3 m/s, and the flow velocity of the cleaning water remains less than 3 m/s.

Preferably, the circulation pump is a positive displacement pump. This displacement pump is preferred because it is more suitable for a fragile and even living food fluid such as liquid yeast or cream yeast for example, as this type of pump will reduce the heating and rough treatment of such fragile and living food fluids. A centrifugal pump or even some other type of pump remains possible. However, a positive displacement pump will allow pushing the food fluid with air as well as with water, while a centrifugal pump will allow pushing the food fluid with water but not air.

Preferably, the length of the piping between the tank of food fluid in the cold room and the metering point furthest from the cold room is greater than 10 m, preferably greater than 20 m, more preferably greater than 30 m, and/or less than 100 m, preferably less than 50 m. On the one hand, the compromise proposed by the invention is particularly attractive when the piping is long. On the other hand, piping that is really too long, while retaining its attraction for the compromise proposed by the invention, may still require other modifications, such as a certain oversizing of the circulation pump (although this will still be less than without the use of the distribution method according to the invention).

Preferably, the metering point is a mixer or the metering points are mixers. A metering point may also for example be a metering point to a pitcher, used in case of failure of the metering points to the mixer, or for the occasional need for a small volume of food fluid.

Preferably, the inner diameter of the supply piping is comprised between 10 and 51 mm, preferably between 19 and 38 mm. These ranges for the diameter allow good optimization of the dimensions of the food fluid distribution system according to the total piping length, according to the number of metering points, according to the frequency and rate of use of the installation, as well as according to the size of the tank of food fluid.

Preferably, the system for distributing food fluid comprises a tank of food fluid in the cold room, and the capacity of the tank of food fluid is comprised between 100 liters and 1000 liters, preferably between 100 liters and 600 liters or between 300 liters and 1000 liters, more preferably between 300 liters and 600 liters. Indeed, the method for distributing liquid yeast and the associated liquid yeast distribution system present an optimal compromise between efficiency and cost, for this type of intermediate capacity corresponding to a medium-sized bakery.

Preferably, at least a portion of an enzymatic liquid, also called an "enhancer", to improve the crispness and/or softness of the dough, is also in circulation with the liquid yeast along the major portion of the supply piping, before pouring into the mixer. In this case, the liquid yeast distribution system also allows the enhancer to be kept at a relatively low temperature for most of the time, and to be outside the cold room for only a short time before it is used.

Preferably, at least some of the metering points or mixers, preferably all, share a same flow meter and/or a same yeast valve connected to a yeast tank in the cold room and/or a same water valve connected to the water inlet. Because a flow meter is an expensive item, sharing it reduces the overall cost of the system. Sharing the same yeast valve and/or the same water valve simplifies the management of the flow of liquid yeast between the cold room and the metering points, as the transition between distribution and no distribution is achieved by controlling a single valve for both the liquid yeast and the water.

Preferably, the pump that pushes the liquid yeast into the supply pipe is located at or near the cold room. The flow meter is also located at or near the cold room. The arrangement of these elements in proximity to the sources of the pushed food fluid or pushed liquid yeast increases the precision in metering the food fluid or liquid yeast, thereby improving the overall reliability of the distribution system for food fluids such as liquid yeast or cream yeast.

In one embodiment, after leaving the cold room, at least a portion of the circulating food fluid is pushed by water in a portion of the supply piping before discharging at the metering point.

In one embodiment, after leaving the cold room, at least a portion of the circulating food fluid is pushed by air in a portion of the supply piping before discharging at the metering point.

In one embodiment, the water that pushes the food fluid is at a pressure of at least 2 bar, preferably at least 3 bar, more preferably at least 5 bar, and/or the circulating food fluid is at a pressure of at least 2 bar, preferably at least 3 bar, more preferably at least 5 bar.

Other features and advantages of the invention will be apparent from reading the following description of a preferred embodiment of the invention, given as an example and with reference to the accompanying drawings.

DETAILED DESCRIPTION OF THE INVENTION

Figure 1:
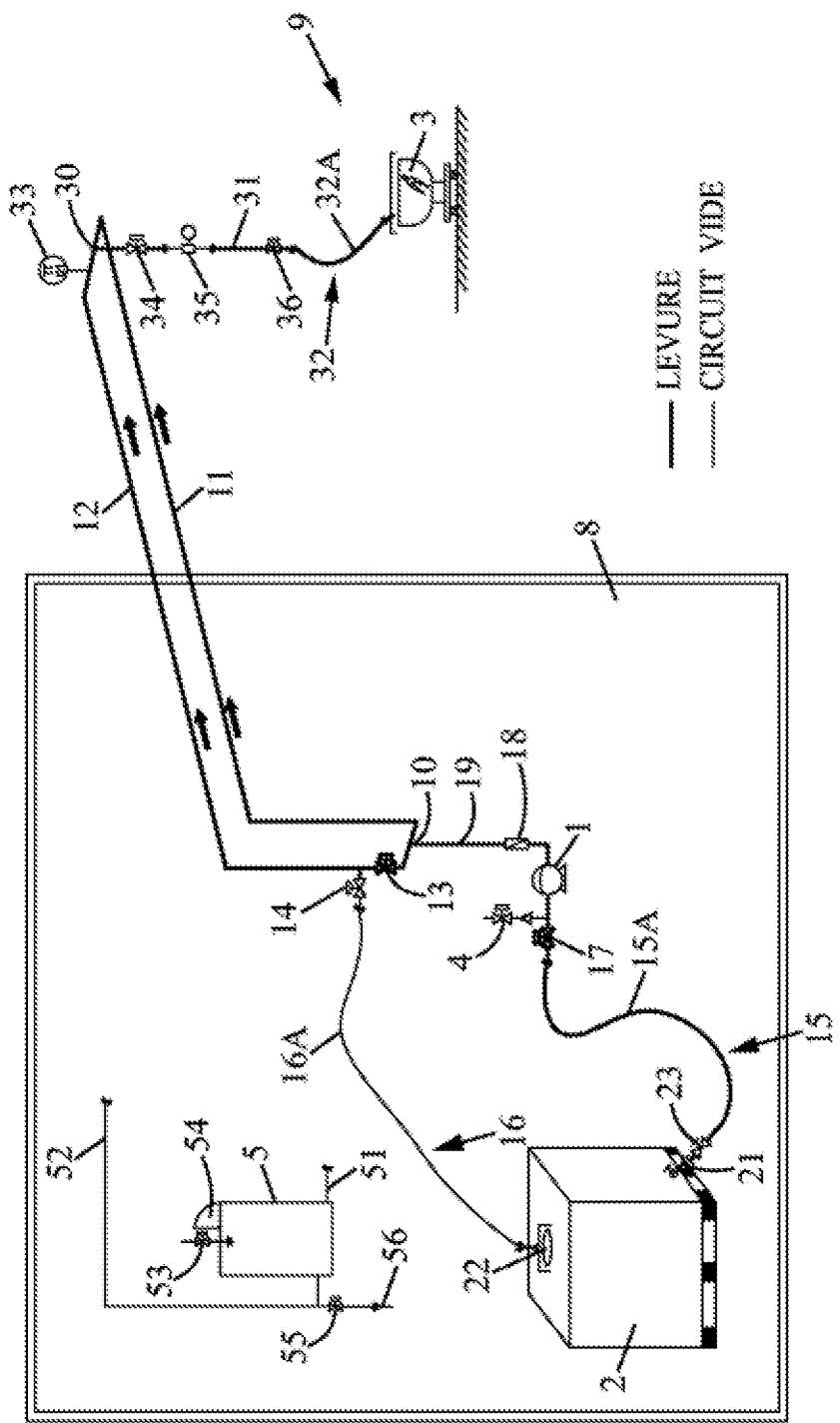
FIG. 1 schematically represents an example of a liquid yeast distribution system in a bakery according to one embodiment of the invention, corresponding to an operating mode of dispensing liquid yeast, in other words here an operating mode of feeding a simultaneous parallel double supply of liquid yeast to a metering point.

FIG. 1 schematically represents an example of a liquid yeast distribution system in a bakery according to one embodiment of the invention, corresponding to an operating mode of dispensing liquid yeast, in other words here an operating mode of feeding a simultaneous parallel double supply of liquid yeast to a metering point.

The bakery comprises a cold room 8 and a bakehouse 9. The cold room 8 comprises at least one tank 2 of liquid yeast, possibly several tanks of liquid yeast used alternately and successively. The cold room 8 also comprises a cleaning device 5. The bakehouse 9 comprises at least one metering point 3 which here leads to inside a mixer 3. The liquid yeast distribution system is located partly in the cold room 8 and partly in the bakehouse 9. The yeast distribution system comprises at least one mixer 3, at least one tank 2 of liquid yeast, at least one water inlet 4 or air inlet 4, at least one cleaning device 5, a circulation pump 1, as well as a liquid yeast distribution device interconnecting these various elements so that both the liquid yeast and the cleaning water can flow within the distribution system.

The tank 2 of liquid yeast is located in the cold room 8. The tank 2 comprises an outlet 21, downstream of which is a tank outlet valve 23, and an inlet 22. The outlet 21 is connected by the valve 23 to a dispensing hose 15 shown here in the position 15A for dispensing liquid yeast from the tank 2 in order to supply liquid yeast to the mixer 3. The inlet 22 is connected directly to a return hose 16 shown here in position 16A enabling the return of liquid yeast to the tank 2.

The liquid yeast distribution device comprises a liquid yeast inlet valve 17 connecting the dispensing hose 15 upstream of the circulation pump 1. A water inlet or air inlet valve 4 is also connected upstream of the circulation pump 1, but downstream of the liquid yeast inlet valve 17. The piping comprises a common segment 19 which connects the downstream of the circulation pump 1 to a branch 10. This common segment 19 comprises a filter 18. At the branch 10, the piping separates into two parts, a feeder line segment 11 and a return segment 12, respectively used as a primary feeder line 11 and secondary feeder line 12 in this operating mode of dispensing liquid yeast.

The feeder line segment 11 leads directly to a bypass 30 at which or near which, either on the feeder line segment 11 or on the return segment 11 is arranged a temperature sensor 33 measuring the temperature of the liquid yeast in the vicinity of the bypass 30.

The return segment 12 is connected to the return hose 16 by a return valve 14. The return segment 12 is connected to the branch 10 by a loop conversion valve 13. The loop conversion valve 13 is located between the point of attachment of the return segment 12 to the return hose 16, and the branch 10.

The piping comprises a metering segment 31 which descends vertically from the bypass 30 to the mixer 3 and which is extended by a metering hose 32, shown here in a metering position 32A which descends into the mixer 3. Along the metering segment 31, between the bypass 30 and the metering hose 32, are successively located a liquid yeast inlet valve 34, a flow meter 35 measuring the flow rate of liquid yeast at its location in the metering segment 31, a regulated metering valve 36 whose progressive opening or closing are regulated based on the flow rate value for the liquid yeast measured by the flow meter 35 and tied to a setpoint value requested by the user of this mixer 3. In contrast, the yeast inlet valve 34 is either fully open or fully closed: it is open during either a phase of supplying the mixer 3 with liquid yeast or a phase of draining the metering segment 31, and it is closed outside these two phases. The height of the segment 31 is for example about 5 m and the diameter of the segment 31 is for example about 25 mm.

The liquid yeast distribution system also comprises a cleaning device 5 located in the cold room 8. The cleaning device 5 accommodates a cleaning water inlet valve 53 and a detergent inlet 54, sends cleaning water (which may or may not contain detergent) by its cleaning feeder line 51, and collects the cleaning water after use via its cleaning return line 52. This cleaning water can either be recycled to serve again and be sent back via the cleaning feeder line 51 if valve 55, which is either fully open or fully closed, is closed, or be drained by the cleaning discharge 56 if valve 56 is open. In liquid yeast dispensing mode, the cleaning device 5 is disconnected from the rest of the liquid yeast distribution system.

In liquid yeast dispensing mode, the tank outlet valve 23, the liquid yeast inlet valve 17, the loop conversion valve 13, and the yeast inlet valve 34, which are all are either fully open or fully closed, are all open. The metering valve 36 is partially open or fully open or fully closed, its degree of opening depending on the liquid yeast flow setpoint set by the user of the mixer 3. Opening the loop conversion valve 13 will have the consequences of eliminating the loop and providing the simultaneous and parallel double supply of liquid yeast to the mixer 3.

In this same liquid yeast dispensing mode, the water inlet valve 4, the return valve 14, the cleaning water inlet valve 53, and the cleaning water discharge valve 55, all either fully open or fully closed, are all closed. Closing the return valve 14 prevents the creation of a loop and prevents any flow in the return hose 16, whether liquid yeast or cleaning water.

In this same liquid yeast dispensing mode, in the dispensing hose 15 in the liquid yeast dispensing position 15A, liquid yeast flows from the tank 2 towards the branch 10. Nothing flows in the return hose 16 in the return position 16A.

In this same liquid yeast dispensing mode, liquid yeast from the dispensing hose 15 passes through the circulation pump 1 to be sent into the common segment 19 by the circulation pump 1 and to pass through the filter 18, before reaching the branch 10.

At the branch 10, because the loop conversion valve 13 is open, the liquid yeast divides into two portions flowing in the direction of the bypass 30, respectively in the feeder line segment 11 used here as a primary feeder line and in the return segment 12 used here as a secondary feeder line, supplying the mixer 3 simultaneously and in parallel, via the bypass 30.

At the bypass 30, because the yeast inlet valve 34 is open and the metering valve 36 is at least partially open, the liquid yeast first flows in the metering segment 31 then flows in the metering hose 32 in metering position 32A, in order to reach the mixer 3.

Figure 2:
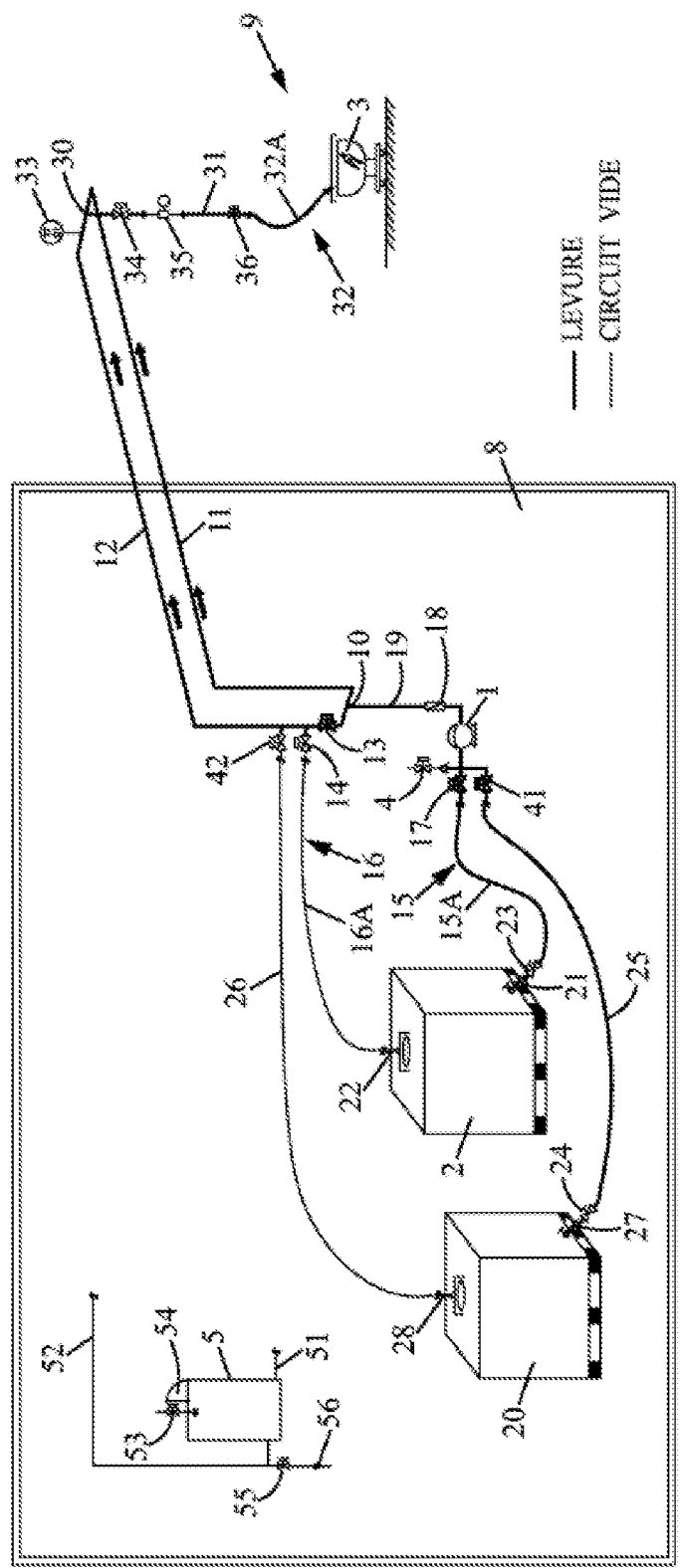
FIG. 2 schematically represents an example of a liquid yeast distribution system in a bakery according to one embodiment of the invention, corresponding to an operating mode of dispensing liquid yeast, with switching between two tanks of liquid yeast located in the cold room.

FIG. 2 schematically represents an example of a liquid yeast distribution system in a bakery according to one embodiment of the invention, corresponding to an operating mode of dispensing liquid yeast, with switching between two tanks of liquid yeast located in the cold room. The solid arrows represent the direction of flow of the liquid yeast in the piping of the liquid yeast distribution system.

The switch between the two tanks may or may not be performed automatically, preferably automatically to better ensure continuity in the supply to the yeast metering points.

The tank 2 of liquid yeast is located in the cold room 8. The tank 2 comprises an outlet 21, downstream of which is a tank outlet valve 23, and an inlet 22. The outlet 21 is connected by the valve 23 to a dispensing hose 15 shown here in the position 15A for dispensing liquid yeast from the tank 2 in order to supply liquid yeast to the mixer 3. The inlet 22 is connected directly to a return hose 16 shown here in position 16A enabling the return of liquid yeast to the tank 2.

Another tank 20 of liquid yeast is located in the cold room 8. This other tank 20 comprises an outlet 27, downstream of which is arranged a tank outlet valve 24, and an inlet 28. The outlet 27 is connected by the valve 24 to a dispensing hose 25 shown here in the for dispensing liquid yeast from the tank 20 in order to supply liquid yeast to the mixer 3. The inlet 28 is connected directly to a return hose 26 shown here in the position for returning liquid yeast to the tank 20.

The liquid yeast distribution device comprises a liquid yeast inlet valve 17 connecting dispensing hose 15 upstream of the circulation pump 1. The liquid yeast distribution device also comprises a liquid yeast inlet valve 41 connecting dispensing hose 25 upstream of the circulation pump 1. A water inlet or air inlet valve 4 is also connected upstream of the circulation pump 1, but downstream of liquid yeast inlet valve 17 and downstream of liquid yeast inlet valve 41. At the branch 10, the piping separates into two parts, a feeder line segment 11 and a return segment 12, respectively used as a primary feeder line 11 and secondary feeder line 12 in this operating mode of dispensing liquid yeast.

The liquid yeast flows, between downstream of the circulation pump 1 and the mixer 3, in the same manner as in FIG. 1.

The liquid yeast distribution system remains in the same state as in FIG. 1.

In liquid yeast dispensing mode, in a first step, tank outlet valve 23, liquid yeast inlet valve 17, loop conversion valve 13, and yeast inlet valve 34, which are all either fully open or fully closed, are all open. Metering valve 36 is partially open or fully open or fully closed, its degree of opening depending on the liquid yeast flow setpoint set by the user of the mixer 3. The opening of loop conversion valve 13 will have the consequences of eliminating the loop and providing the simultaneous and parallel double supply of liquid yeast to the mixer 3.

In this same liquid yeast dispensing mode, water inlet valve 4, return valve 14, cleaning water inlet valve 53 and cleaning water discharge valve 55, tank outlet valve 24, liquid yeast inlet valve 41, and return valve 42, all either fully open or fully closed, are all closed. The closing of return valve 14 prevents the creation of a loop and prevents any flow in return hose 16, whether liquid yeast or cleaning water. The closing of return valve 42 prevents the creation of a loop and prevents any flow in return hose 26, whether liquid yeast or cleaning water.

In this same liquid yeast dispensing mode, in dispensing hose 15 in liquid yeast dispensing position 15A, liquid yeast flows from tank 2 towards the branch 10. Nothing flows in return hose 16 in return position 16A. Nothing flows in return hose 26 either, in the return position. Nothing flows in dispensing hose 25 either, in the dispensing position.

In this same liquid yeast dispensing mode, liquid yeast from dispensing hose 15 passes through the circulation pump 1 to be sent into the common segment 19 by the circulation pump 1 and to pass through the filter 18, before reaching the branch 10.

Once liquid yeast tank 2 has been completely emptied, tank outlet valve 23 and liquid yeast inlet valve 17 which were open become closed. The empty tank 2 is removed to be replaced by a new tank 2 filled with liquid yeast. Alternatively, this empty tank 2 is removed to be refilled with liquid yeast and then put back into place. Alternatively, in the case of using a refrigerated tank, it may simply be cleaned and refilled with liquid yeast. This makes it possible to avoid interruptions in the supply of liquid yeast to the metering points.

In liquid yeast dispensing mode, in a second step, tank outlet valve 24 and liquid yeast inlet valve 41, which were closed, become open, and tank outlet valve 23 and liquid yeast inlet valve 17, which were open, become closed. Loop conversion valve 13 and yeast inlet valve 34, which are either fully open or fully closed, remain open. Metering valve 36 is partially open or fully open or fully closed, its degree of opening depending on the liquid yeast flow setpoint set by the user of the mixer 3. The opening of loop conversion valve 13 will have the consequences of eliminating the loop and providing the simultaneous and parallel double supply of liquid yeast to the mixer 3.

In this same liquid yeast dispensing mode, water inlet valve 4, return valve 14, cleaning water inlet valve 53 and cleaning water discharge valve 55, and return valve 42, all either fully open or fully closed, remain closed. The closing of return valve 14 prevents the creation of a loop and prevents any flow in return hose 16, whether liquid yeast or cleaning water. The closing of return valve 42 prevents the creation of a loop and prevents any flow in return hose 26, whether liquid yeast or cleaning water.

In this same liquid yeast dispensing mode, in dispensing hose 25 in liquid yeast dispensing position, liquid yeast flows from tank 20 towards the branch 10. Nothing flows in return hose 16 in return position 16A. Nothing flows in return hose 26 either, in the return position. Nothing flows in dispensing hose 15 either, in dispensing position 15A.

In this same liquid yeast dispensing mode, liquid yeast from dispensing hose 25 passes through the circulation pump 1 to be sent into the common segment 19 by the circulation pump 1 and to pass through the filter 18, before reaching the branch 10.

Once liquid yeast tank 20 has been completely emptied, tank outlet valve 24 and liquid yeast inlet valve 41 which were open become closed. The empty tank 20 is removed to be replaced with a new tank 20 filled with liquid yeast. Alternatively, this empty tank 20 is removed to be refilled with liquid yeast and then put back into place. Then the liquid yeast distribution from tank 2 can resume, by opening tank outlet valve 23 and liquid yeast inlet valve 17 which were closed. This makes it possible to avoid interruptions in the supply of liquid yeast to the metering points.

Figure 3:
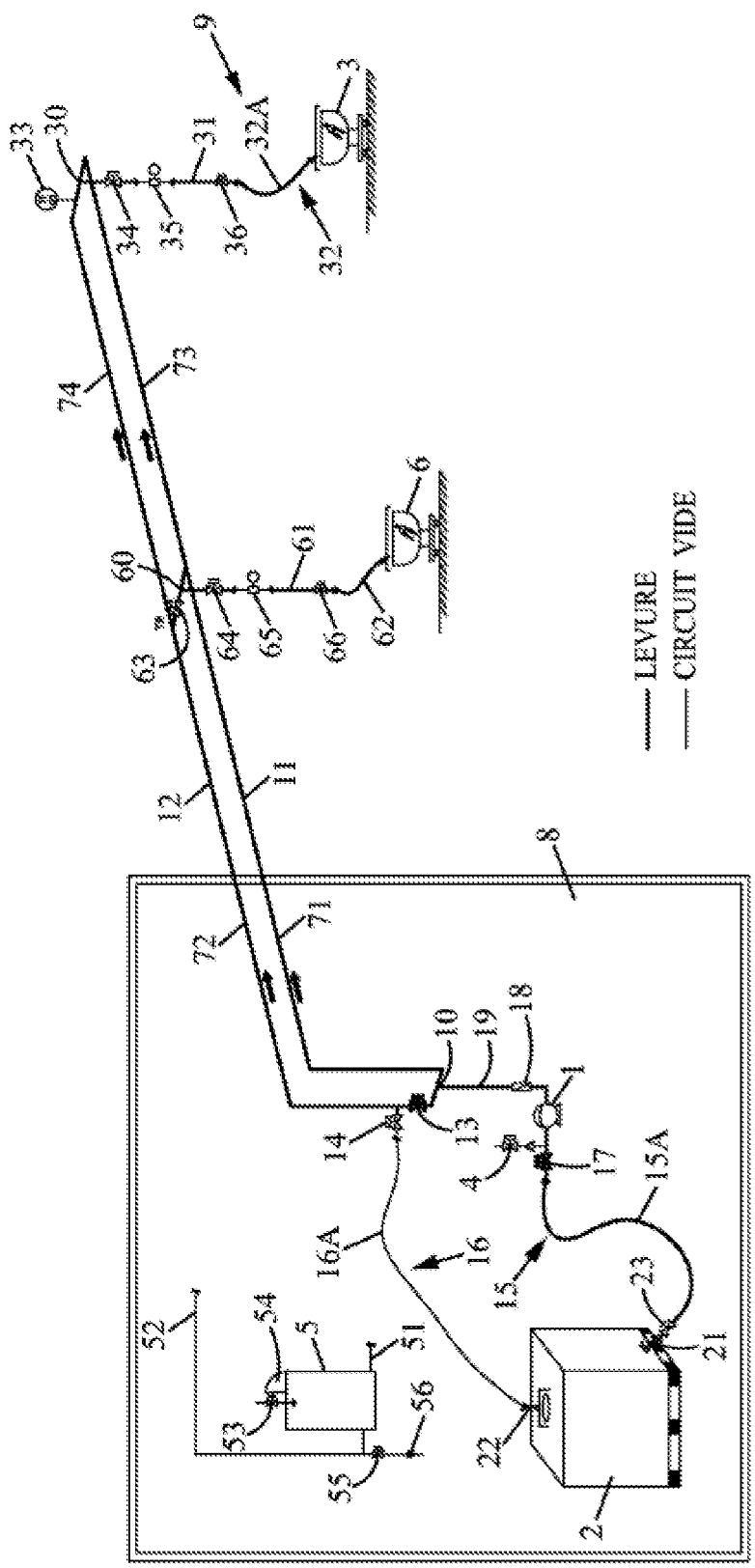
FIG. 3 schematically represents an example of a liquid yeast distribution system in a bakery according to one embodiment of the invention, corresponding to an operating mode of dispensing liquid yeast, in other words here an operating mode with a simultaneous parallel double supply of liquid yeast to several metering points respectively located at different distances from the cold room.

FIG. 3 schematically represents an example of a liquid yeast distribution system in a bakery according to one embodiment of the invention, corresponding to an operating mode of dispensing liquid yeast, in other words here an operating mode with a simultaneous parallel double supply of liquid yeast to several metering points respectively located at different distances from the cold room. The solid arrows represent the direction of flow of the liquid yeast in the piping of the liquid yeast distribution system.

The tank 2 of liquid yeast is located in the cold room 8 and arranged in the same manner as in FIG. 1.

At the branch 10, the piping separates into two parts, a feeder line segment 11 and a return segment 12, respectively used as a primary feeder line 11 and secondary feeder line 12 in this operating mode of dispensing liquid yeast.

The feeder line segment 11, used as the primary feeder line 11 in this operating mode of dispensing liquid yeast, comprises a first portion 71 to an intermediate bypass 60, then a second portion 73 to the final bypass 30.

The return segment 12, used as the secondary feeder line 12 in this operating mode of dispensing liquid yeast, comprises a first portion 72 to an intermediate bypass 60, then a second portion 74 to the final bypass 30. Between the intermediate bypass 60 and the final bypass 30 there is arranged a supplemental loop conversion valve 63 which is either fully open or fully closed. This supplemental loop conversion valve 63 is opened in the dispensing operating mode, thus allowing the simultaneous parallel double supply of liquid yeast to an intermediate metering point 6 connected to the intermediate bypass 60, and thus also preventing the formation of a circulation loop. However, this supplemental loop conversion valve 63 will be closed, just like the liquid yeast inlet valve 64 of the intermediate metering point 6, for all operating modes with a circulation loop, and in particular the recooling, recovery, and cleaning operating modes. The supplemental loop conversion valve 63 and the liquid yeast inlet valve 64 of the metering point can be operated intermittently during the washing steps when cleaning.

The first portion 71 of the feeder line segment 11 leads directly to an intermediate bypass 60, then the second portion 73 of the feeder line segment 11 extends this first portion 71 in order to lead from the intermediate bypass 60 to the final bypass 30 at or near which is arranged, either on the feeder line segment 11 or on the return segment 12, a temperature sensor 33 measuring the temperature of the liquid yeast in the vicinity of the final bypass 30.

The first portion 72 of the return segment 12 leads directly to an intermediate bypass 60, then the second portion 74 of the return segment 12 extends this first portion 72 in order to lead from the intermediate bypass 60 to the final bypass 30.

The first portion 72 of the return segment 12 is connected to the return hose 16 by a return valve 14. The first portion 72 of the return segment 12 is connected to the branch 10 by a loop conversion valve 13. The loop conversion valve 13 is located between the point of attachment of the first portion 72 of the return segment 12 to the return hose 16, and the branch 10.

The piping comprises a metering segment 61 which descends vertically from intermediate bypass 60 to mixer 6 and which is extended by a metering hose 62, shown here in a metering position which descends into mixer 6. Along metering segment 61, between intermediate bypass 60 and metering hose 62, are successively located a liquid yeast inlet valve 64, a flow meter 65 measuring the flow rate of liquid yeast at its location in metering segment 61, a regulated metering valve 66 whose progressive opening or closing are regulated based on the flow rate value for the liquid yeast measured by flow meter 65 and tied to a setpoint value requested by the user of mixer 6. In contrast, yeast inlet valve 64 is either fully open or fully closed: it is open during either a phase of supplying mixer 6 with liquid yeast or a phase of draining metering segment 61, and is closed outside these two phases.

The piping also comprises a metering segment 31 which descends vertically from final bypass 30 to mixer 3 and which is extended by a metering hose 32, shown here in a metering position 32A which descends into mixer 3. Along metering segment 31, between final bypass 30 and metering hose 32, are successively located a liquid yeast inlet valve 34, a flow meter 35 measuring the flow rate of liquid yeast at its location in metering segment 31, a regulated metering valve 36 whose progressive opening or closing are regulated based on the flow rate value for the liquid yeast measured by flow meter 35 and tied to a setpoint value requested by the user of mixer 3. In contrast, yeast inlet valve 34 is either fully open or fully closed: it is open during either a phase of supplying mixer 3 with liquid yeast or during a phase of draining metering segment 31, and is closed outside these two phases.

The liquid yeast distribution system also comprises a cleaning device 5 located in the cold room 8, arranged in the same manner as in FIG. 1.

In liquid yeast dispensing mode, yeast inlet valve 64 and yeast inlet valve 34, which are either fully open or fully closed, are both open. Metering valve 66 is partially open or fully open or fully closed, its degree of opening depending on the setpoint for the flow of liquid yeast as set by the user of mixer 6. Metering valve 36 is partially open or fully open or fully closed, its degree of opening depending on the setpoint for the flow of liquid yeast as set by the user of mixer 3. Opening the loop conversion valve 13 will have the consequences of eliminating the loop and providing a simultaneous parallel double supply of liquid yeast to mixer 3.

Between the tank 2 of liquid yeast and the branch 10 in the piping, the liquid yeast distribution system operates in the same manner as in FIG. 1.

At the branch 10, because the loop conversion valve 13 is open, the liquid yeast is divided into two parts: the first part initially flowing towards the intermediate bypass 60 and then towards the final bypass 30, respectively first in the first portion 71 of the feeder line segment 11 then in the second portion 73 of the feeder line segment 11, this feeder line segment 11 being used here as the primary feeder line; and the second part initially flowing towards the intermediate bypass 60 and towards then the final bypass 30, respectively first in the first portion 72 of the feeder line return segment 12 then in the second portion 74 of the return segment 12, this return segment 12 being used here as the secondary feeder line. The feeder line segment 11 used here as the primary feeder line and the return segment 12 used here as the secondary feeder line, supply simultaneously and in parallel, first mixer 6 via the intermediate bypass 6, then mixer 3 via the final bypass 30.

At the intermediate bypass 60, because yeast inlet valve 64 is open and metering valve 66 is at least partially open, the liquid yeast first flows in metering segment 61, then flows in metering hose 62 in a metering position, in order to reach mixer 6.

At the final bypass 30, because yeast inlet valve 34 is open and metering valve 36 is at least partially open, the liquid yeast first flows in metering segment 31, then flows in metering hose 32 in a metering position 32A, in order to reach mixer 3.

Figure 4:
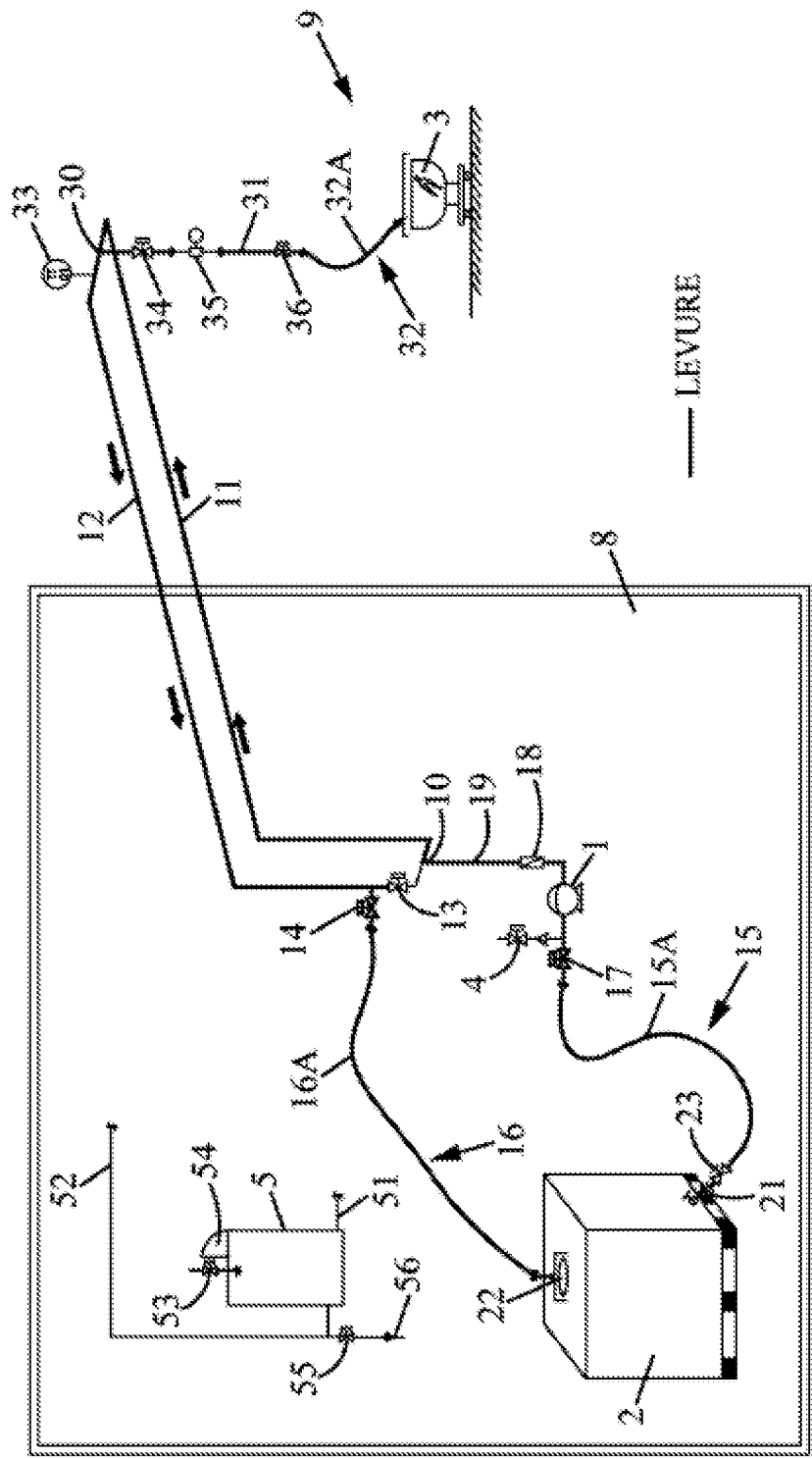
FIG. 4 schematically represents an example of a liquid yeast distribution system in a bakery according to one embodiment of the invention, corresponding to an operating mode of recooling liquid yeast, in other words an operating mode of closed-loop circulation of liquid yeast.

FIG. 4 schematically represents an example of a liquid yeast distribution system in a bakery according to one embodiment of the invention, corresponding to an operating mode of recooling liquid yeast, in other words an operating mode of closed-loop circulation of liquid yeast. The solid arrows represent the direction of flow of the liquid yeast in the piping of the liquid yeast distribution system. As an indication, a recooling operation may be performed every 2 to 3 hours for example.

The tank 2 of liquid yeast is located in the cold room 8. The part of the tank 2 located between its outlet 21 and the branch 10 is arranged and operates in the same manner as in FIG. 1. The inlet 22 is connected directly to a return hose 16 shown here in position 16A enabling the return of liquid yeast to the tank 2.

At the branch 10, the piping separates into two parts, a feeder line segment 11 and a return segment 12, respectively used, in this operating mode of recooling liquid yeast, as the infeed portion of the liquid yeast circulation loop coming from the outlet 21 of the tank 2 and as the return portion of the liquid yeast circulation loop returning to the inlet 22 of the tank 2. Liquid yeast warmed by an extended stay in the piping can thus be replaced, and may even be regularly replaced, by fresh yeast coming directly from the tank 2 that is kept cool in the cold room 8. The warmed liquid yeast arriving through the inlet 22 of the tank 2 flows into the upper portion of the tank 2, while the fresh liquid yeast exiting via the outlet 21 is drawn out of the lower portion of the tank 2 by the circulation pump 1.

The feeder line segment 11 leads directly to a bypass 30 at which or near which, either on the feeder line segment 11 or on the return segment 12, is arranged a temperature sensor 33 measuring the temperature of the liquid yeast in the vicinity of the bypass 30. If a high temperature threshold is exceeded, the recooling operating mode is activated, and the liquid yeast circulation loop operates for a certain amount of time, sufficient for all warmed yeast present in the piping to be been replaced by fresh yeast from the tank 2 in the cold room 8.

The return segment 12 is connected to the return hose 16 by a return valve 14. The return segment 12 is connected to the branch 10 by a loop conversion valve 13. The loop conversion valve 13 is located between the point of attachment of the return segment 12 to the return hose 16, and the branch 10.

The piping comprises a metering segment 31 which descends vertically from the bypass 30 to the mixer 3 in the same manner as in FIG. 1. The yeast inlet valve 34, which is either fully open or fully closed, is closed to prevent the liquid yeast circulating in the loop from diverting towards the mixer 3.

The liquid yeast distribution system also comprises a cleaning device 5 which is located in the cold room 8 and which is arranged in the same manner as in FIG. 1.

In liquid yeast recooling mode, the tank outlet valve 23, the liquid yeast inlet valve 17, and the return valve 14, which are all either fully open or fully closed, are all open. The open state of the metering valve 36 is irrelevant, as the liquid yeast inlet valve 34 is closed.

In this same liquid yeast recooling mode, the water inlet valve 4, the loop conversion valve 13, and the yeast inlet valve 34, the cleaning water inlet valve 53, and the cleaning water discharge valve 55, all either fully open or fully closed, are all closed.

Opening the return valve 14 and closing the loop conversion valve 13 will have the consequences of providing a liquid yeast circulation loop from the tank 2 to the bypass point 30 for the infeed portion of the loop, then from the bypass point 30 to the tank 2 for the return portion of the loop. Opening the return valve 14 to create a loop will send the liquid yeast, as it returns, to flow in the return hose 16.

In this same liquid yeast recooling mode, in the dispensing hose 15 in liquid yeast dispensing position 15A, fresh liquid yeast flows from the tank 2 and towards the branch 10. Similarly, warmed liquid yeast flows in the return hose 16 in the return position 16A, to the tank 2.

In this same liquid yeast recooling mode, liquid yeast from the dispensing hose 15 passes through the circulation pump 1 to be sent into the common segment 19 by the circulation pump 1 and to pass through the filter 18, before reaching the branch 10.

At the branch 10, because the loop conversion valve 13 is closed, all the liquid yeast flows in the direction of the bypass 30, first in the feeder line segment 11 used here as the infeed portion of the loop and then returns in the return segment 12 used here as the return portion of the loop, to then be reincorporated in the tank 2, without flowing down into the mixer 3 when it reaches the bypass 30, because the yeast inlet valve 34 is closed.

Figure 5:
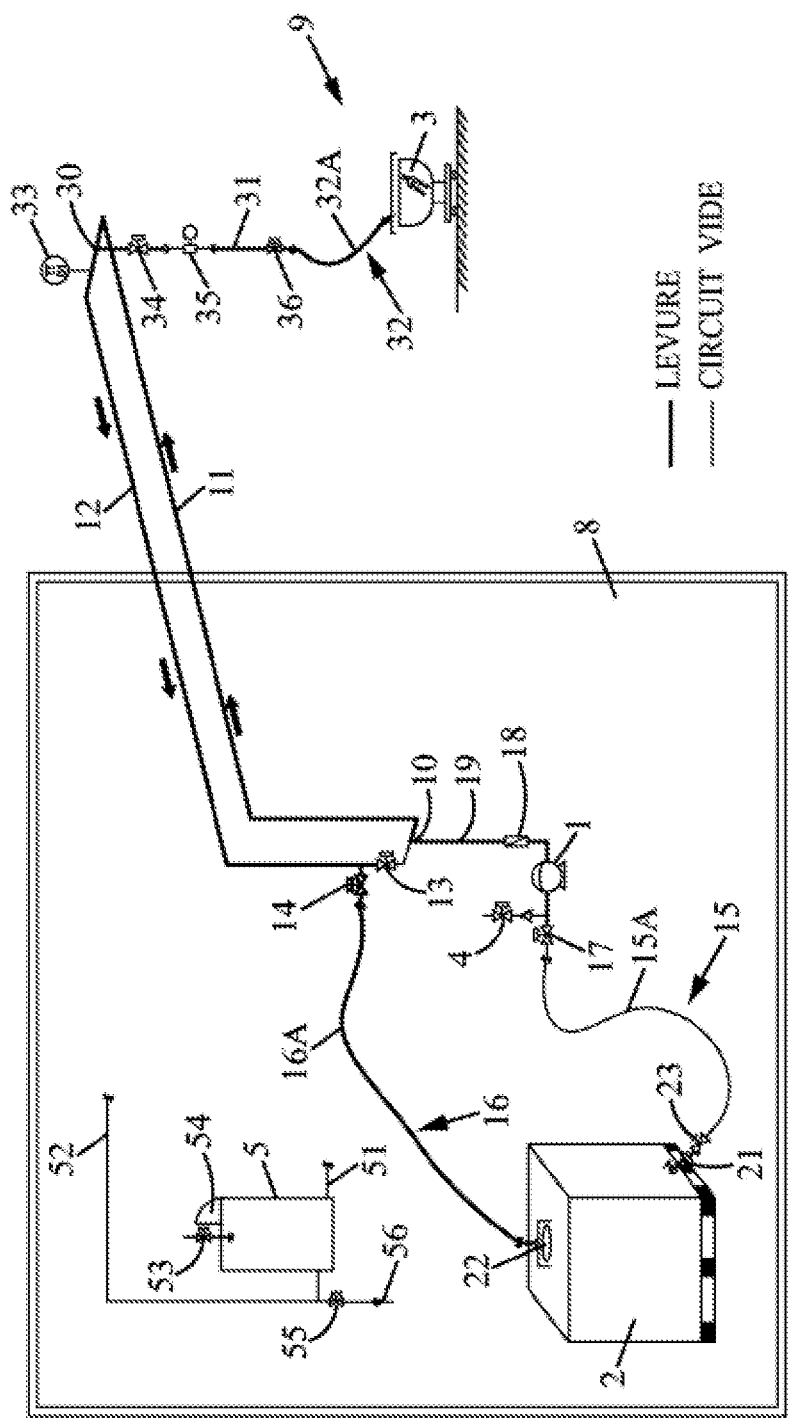
FIG. 5 schematically represents an example of a liquid yeast distribution system in a bakery according to one embodiment of the invention, corresponding to an operating mode of recovering liquid yeast, in other words an operating mode of open-loop circulation of liquid yeast, using a water inlet located just upstream of the circulation pump.

FIG. 5 schematically represents an example of a liquid yeast distribution system in a bakery according to one embodiment of the invention, corresponding to an operating mode of recovering liquid yeast, in other words an operating mode of open-loop circulation of liquid yeast, using a water inlet located just upstream of the circulation pump. The solid arrows represent first the direction of flow of the liquid yeast pushed by water or air in the piping of the liquid yeast distribution system, then the direction of flow of the water or air that has pushed the recovered liquid yeast into the tank of liquid yeast of the liquid yeast distribution system.

The tank 2 of liquid yeast is located in the cold room 8. The part of the tank 2 located between its outlet 21 and the branch 10 is arranged and operates in the same manner as in FIG. 1. The inlet 22 is connected directly to a return hose 16 shown here in position 16A enabling the return of liquid yeast to the tank 7.

In this same liquid yeast recovery mode, in the dispensing hose 15 in liquid yeast dispensing position 15A, nothing flows from the tank 2 because the outlet valve 23 of the tank 2 is closed and because the liquid yeast inlet valve 17 is also closed.

In this same liquid yeast recovery mode, in the return hose 16 in the liquid yeast return position 16A, liquid yeast pushed by water or air flows from the return segment 12 of the piping to be collected in the tank 2, because the inlet 22 of the tank 2 is open and because the return valve 14 is also open, the loop conversion valve 13 being closed.

In this same liquid yeast recovery mode, with water or air coming from the water or air inlet, the water or air inlet valve 4 being open, the water or air drawn by the circulation pump 1 pushes the liquid yeast out of the common segment 19 into the loop infeed segment 11.

At the branch 10, the piping separates into two parts, a feeder line segment 11 and a return segment 12, respectively used, in this operating mode of recovering liquid yeast, as the infeed portion of the circulation loop for the liquid yeast pushed by the water or air supplied by the water or air inlet, the water or air inlet valve 4 being open, and as the return portion of the circulation loop for the liquid yeast pushed by the water or air and returning to the inlet 22 of the tank 2. Liquid yeast located in the piping can thus be collected in the tank 2 located in the cold room 8. The liquid yeast to be recovered, arriving through the inlet 22 of the tank 2, flows into the upper portion of the tank 2. Once all the liquid yeast has been collected, the pushing water or air can be expelled by hose 16 extracted from the tank 2 and directed towards drainage not shown in FIG. 5.

The circulation loop for liquid yeast pushed by water or air in this liquid yeast recovery mode is the same as the circulation loop for liquid yeast alone in the liquid yeast recooling mode presented in FIG. 4, with the differences that this recovery circulation loop is an open loop, whereas the recooling circulation loop of FIG. 4 was a closed loop, and that water pushes the liquid yeast in the circulation loop instead of only liquid yeast being present in the circulation loop.

The feeder line 11 and return 12 segments as well as the segment 31 at the bypass 30 leading to the mixer 3, are arranged and operate in the same manner as in FIG. 4, starting from the branch 10. Here, the switching to recovery mode after dispensing mode for example is triggered by shutting off the operation of the liquid yeast distribution system, for example at the end of the day until the following morning for small bakeries, or for example at the end of the week until the beginning of the following week for medium-sized bakeries.

The liquid yeast distribution system also comprises a cleaning device 5 which is located in the cold room 8 and which is arranged in the same manner as in FIG. 1.

In liquid yeast recovery mode, the water inlet valve 4 and the return valve 14, which are either fully open or fully closed, are both open. The open state of the metering valve 36 is irrelevant, as the liquid yeast inlet valve 34 is closed.

In this same liquid yeast recovery mode, the loop conversion valve 13, the liquid yeast inlet valve 17, the tank outlet valve 23, the yeast inlet valve 34, the cleaning water inlet valve 53, and the cleaning water discharge valve 55, which are all either fully open or fully closed, are all closed.

Opening the return valve 14 and closing the loop conversion valve 13 will have the consequences of providing a circulation loop for liquid yeast pushed by water or air from the open water or air inlet valve 4 to the bypass point 30 for the infeed portion of the loop, and then from the bypass point 30 to the tank 2 for the return portion of the loop. Opening the return valve 14 to create a loop will send the liquid yeast pushed by the water or the air, as it returns, to flow in the return hose 16 until it is reincorporated in the tank 2.

Figure 6:
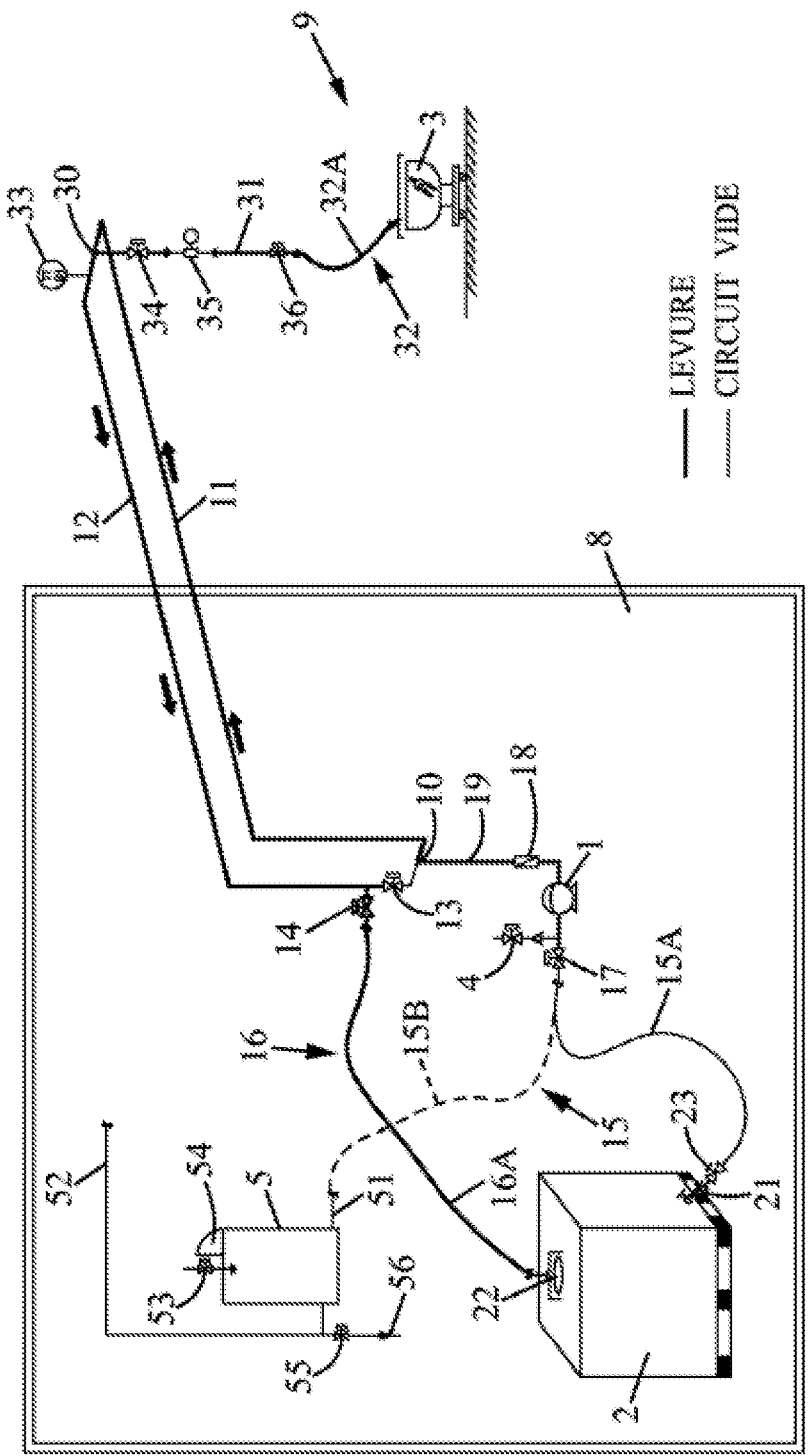
FIG. 6 schematically represents an example of a liquid yeast distribution system in a bakery according to one embodiment of the invention, corresponding to an operating mode of recovering liquid yeast, in other words an operating mode of open-loop circulation of liquid yeast, but using the water inlet used for cleaning which is remote from the circulation pump.

FIG. 6 schematically represents an example of a liquid yeast distribution system in a bakery according to one embodiment of the invention, corresponding to an operating mode of recovering liquid yeast, in other words an operating mode of open-loop circulation of liquid yeast, but using the water inlet used for cleaning which is remote from the circulation pump. The solid arrows represent first the direction of flow of the liquid yeast pushed by water or air in the piping of the liquid yeast distribution system, then the direction of flow of the water or air that has pushed the recovered liquid yeast into the tank of liquid yeast of the liquid yeast distribution system. It would also be possible to create a liquid yeast recovery loop through the use of an air inlet.

In this same alternative liquid yeast recovery mode, in the dispensing hose 15 in the cleaning position 15B although not in cleaning mode, nothing flows from the tank 2 because the outlet valve 23 of the tank 2 is closed and because the dispensing hose 15 is disconnected from the tank 2.

In this same alternative liquid yeast recovery mode, no water or air is coming from the water or air inlet, because either the water or air inlet valve 4 is closed or the water or air inlet and the corresponding inlet valve 4 do not exist.

On the contrary, it is the water coming from the cleaning device 5 which is drawn by the circulation pump 1 to push the liquid yeast out of the common segment 19 into the loop infeed segment 11.

In the alternative liquid yeast recovery mode where the yeast is pushed by water, the cleaning device 5 is connected to the rest of the liquid yeast distribution system, but only through its cleaning feeder line 51 which sends water without detergent into the dispensing hose 15 which, in the cleaning position 15B, is connected to this cleaning feeder line 51.

The cleaning device 5 accommodates a cleaning water inlet valve 53 and a detergent inlet 54, sends water (which here does not include detergent) by its cleaning feeder line 51, and does not collect this water after use via its cleaning return line 52 because this cleaning return line 52 is not connected to the rest of the liquid yeast distribution system.

The cleaning water inlet valve 53 is open, the detergent inlet 54 being deactivated, which sends water (here without detergent) by its cleaning feeder line 51, into the hose 15 in cleaning position 15B. This water without detergent passes through the liquid yeast inlet valve 17 which is open, and is then drawn by the circulation pump 1 which will send this water to push the liquid yeast in the circulation loop for liquid yeast recovery described in FIG. 5.

This liquid yeast pushing water coming from the cleaning device 5 will push the liquid yeast in its open-loop circulation until the liquid yeast has been collected in the tank 2.

The open or closed state of the discharge valve 55 is immaterial, because the cleaning return 52 is disconnected from the rest of the liquid yeast distribution system.

The remainder of the liquid yeast distribution system functions in the same manner as in the liquid yeast recovery mode shown in FIG. 5.

Figure 7:
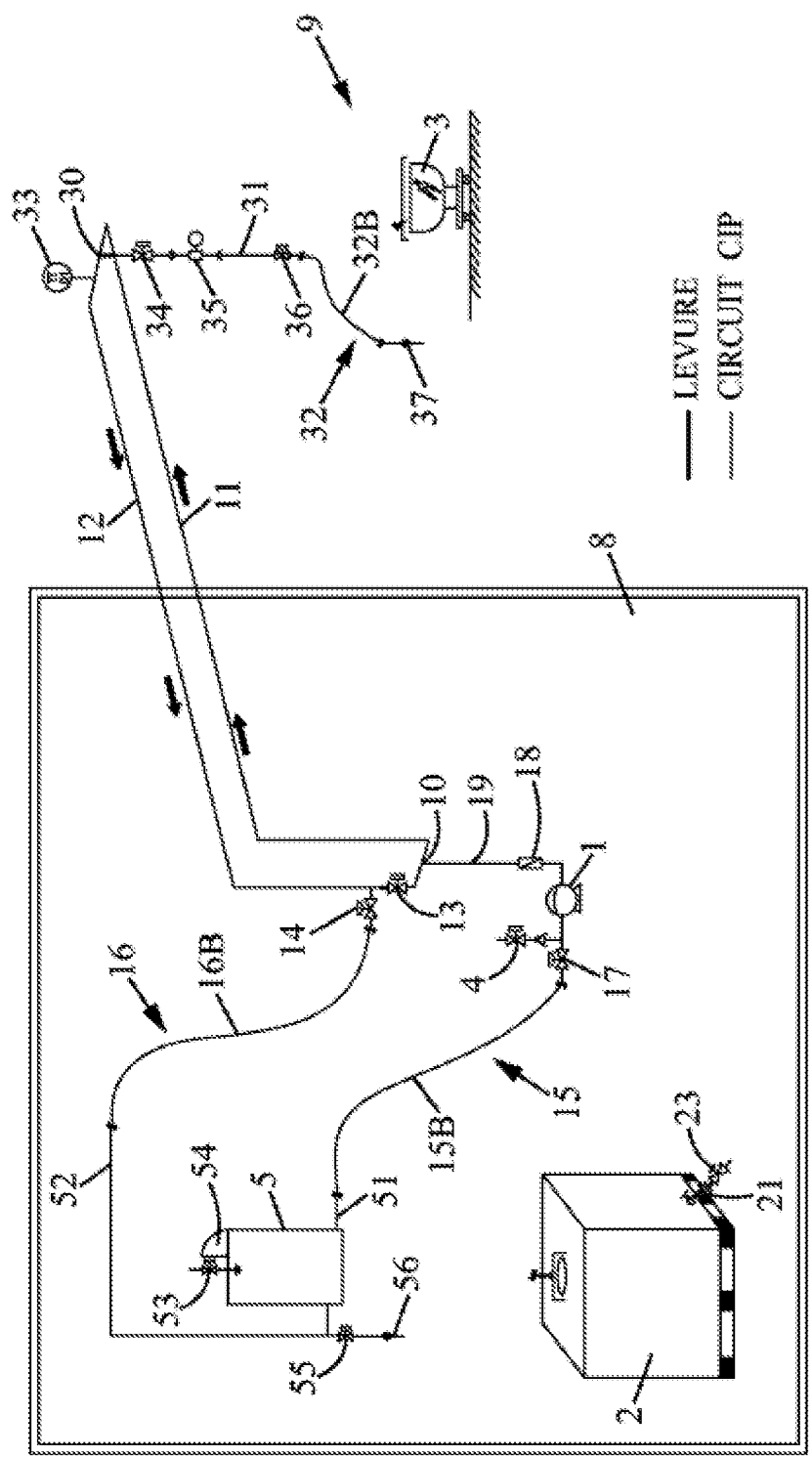
FIG. 7 schematically represents an example of a liquid yeast distribution system in a bakery according to one embodiment of the invention, corresponding to an operating mode of pipe cleaning by the circulation of cleaning water, in other words an operating mode with a cleaning water circulation loop, first closed then opened to drain the used cleaning water, using the cleaning water inlet which is distanced from the circulation pump.

FIG. 7 schematically represents an example of a liquid yeast distribution system in a bakery according to one embodiment of the invention, corresponding to an operating mode of pipe cleaning by the circulation of cleaning water, in other words an operating mode with a cleaning water circulation loop, first closed then opened to drain the used cleaning water, using the cleaning water inlet which is distanced from the circulation pump. The solid arrows represent the direction of flow of the cleaning water in the piping of the liquid yeast distribution system.

Such washing, advantageously weekly, corresponding to a prolonged shutdown of the liquid yeast distribution system, more specifically corresponds to a cleaning process preferably comprising three steps. The first step is a prewash, in other words a washing of the entire liquid yeast distribution circuit with water only, in order to empty the liquid yeast distribution circuit of most of the liquid yeast remaining therein. The second step is the actual washing, in other words washing the entire liquid yeast distribution circuit with water and detergent. The detergent is advantageously added directly to the cleaning device 5, for example in a cleaning tank, using a detergent inlet 54 which is then activated. In this second step, a first phase of 15 to 20 minutes is carried out while recycling this wash water comprising the detergent, so that the detergent has time to act, followed by a shorter second phase which is carried out while emptying the dirty wash water. The third step is a rinse, in other words a washing of the entire liquid yeast distribution circuit with water only, in order to remove the remaining traces of detergent. Each of these cleaning phases will follow the cycle below, but although the washing phase generally involves recycling to save water and detergent, the prewash and rinse phases can be carried out in an open circuit, in other words with discharge of the cleaning water once it has completed a circuit in the cleaning water circulation loop.

One of the above cycles is now described in more detail.

The tank 2 of liquid yeast is located in the cold room 8. The tank 2 is completely disconnected from the rest of the liquid yeast distribution system.

In this cleaning mode, in the dispensing hose 15 in the cleaning position 15B, cleaning water flows from the cleaning feeder line 51 towards the branch 10. Similarly, cleaning water flows in the return hose 16 in the cleaning position 1613, to the cleaning return line 52 of the cleaning device 5.

In this same cleaning mode, cleaning water from the dispensing hose 15 passes through the circulation pump 1 to be sent into the common segment 19 by the circulation pump 1 and to pass through the filter 18, before reaching the branch 10.

More specifically, the flow of cleaning water in the water circulation circuit proceeds as follows. Water arrives by the cleaning water inlet 53, passes through the cleaning device 5, or more precisely passes through a cleaning tank of said device, exits through the cleaning feeder line 51, passes through the dispensing hose 15 in the cleaning position 15B, before passing through the yeast inlet valve 17 which is open, ascends to the circulation pump 1, passes through the yeast filter 18, and reaches the branch 10.

At the branch 10, the piping separates into two parts, a feeder line segment 11 and a return segment 12, respectively used in this cleaning operating mode as an infeed portion of the circulation loop for cleaning water coming from the cleaning feeder line 51 of the cleaning device 5 and as a return portion of the circulation loop for cleaning water returning to the cleaning return line 52 of the cleaning device 5.

The feeder line segment 11 leads directly to a bypass 30. The return segment 12 is connected to the return hose 16 by a return valve 14. The return segment 12 is connected to the branch 10 by a loop conversion valve 13. The loop conversion valve 13 is located between the point of attachment of the return segment 12 to the return hose 16, and the branch 10.

The piping comprises a metering segment 31 which descends vertically from the bypass 30 to the mixer 3 in the same manner as in FIG. 1. The yeast inlet valve 34, either fully open or fully closed, is closed to prevent the liquid yeast circulating in the loop from diverting towards the mixer 3.

In this cleaning mode, the liquid yeast inlet valve 17 and the return valve 14, which are either fully open or fully closed, are both open. The open state of the metering valve 36 is irrelevant, as the liquid yeast inlet valve 34 is closed.

In this same cleaning mode, the water inlet valve 4, the loop conversion valve 13, and the yeast inlet valve 34, which are all either fully open or fully closed, are all closed.

First, the cleaning water inlet valve 53 is first opened to fill the circulation loop with clean cleaning water, and then is closed while the cleaning water completes one or more circuits in the cleaning water circulation loop, sufficient time to carry along with it the remaining yeast and/or detergent, while the cleaning water discharge valve 55, which is either fully open or fully closed, remains closed. Then, to change the cleaning water, the cleaning water discharge valve 55 is opened, which allows the used cleaning water to be drained by the discharge 56.

Opening the return valve 14 and closing the loop conversion valve 13 will have the consequences of providing a cleaning water circulation loop from the cleaning device 5 to the bypass point 30 for the infeed portion of the loop, then from the bypass point 30 to the cleaning device 5 for the return portion of the loop. Opening the return valve 14 to create a loop will send the cleaning water, as it returns, to flow in the return hose 16.

At the branch 10, because the loop conversion valve 13 is closed, all the cleaning water flows in the direction of the bypass 30, first in the feeder line segment 11 used here as the infeed portion of the loop and then returns in the return segment 12 used here as the return portion of the loop, to then be reincorporated in the cleaning device 5, without flowing down into the mixer 3 when it reaches the bypass 30, because the yeast inlet valve 34 is closed.

Another type of cleaning, including prewash, wash, and rinse, may also be performed to clean segment 31. The return valve 14 and the loop conversion valve 13 are closed. The liquid yeast inlet valve 34 and the metering valve 36 are open. Hose 32 is in the cleaning position 32B and leads away from the mixer 3 to a drainage 37. In this other type of washing, which thus washes segment 31, no recycling of detergent-containing wash water is provided; indeed, this wash water passes through only once, as does the prewash water and the rinse water.

After all the final rinse steps have been completed, drainage of the rinse water remaining in the piping can be carried out at the various low points of the facility, for example drainage 37, drainage 56, or other low points which provide the possibility of opening the piping.

Some numerical examples will now be compared.

In a facility according to the first prior art, in other words operating only in "single feeder line" mode, the following characteristics are obtained:

TABLE 1

| Type of fluid | Liquid yeast | Water |
| --- | --- | --- |
| Viscosity of fluid | 150 cps | 1 cps |
| Length of piping for the fluid | 50 m | 100 m |
| Diameter of piping for the fluid | 26 mm | 26 mm |
| Flow velocity of the fluid | 0.52 m/s | 2 m/s |
| Head loss pressure | 2.5 bar | 2.5 bar |
| Flow rate of circulation pump | 1000 l/h | 4000 l/h |

The head loss pressure is the difference between the pressure of the fluid and the metering pressure. The metering pressure is between 1 and 3 bar. In the tables presented, the metering pressure is about 1 bar. The metering pressure is the pressure of the liquid yeast at the metering point.

This feeder line, its piping having a length of 50 m and a diameter of 26 mm, the capacity of the piping thus being about 0.53 l/m (liters per meter), will have the disadvantage of causing a loss of about 24 liters of liquid yeast with each facility shutdown lasting several hours. In addition, this facility requires a circulation pump powerful enough to provide a cleaning water flow rate of about 4000 liters per hour (l/h).

In a facility according to the second prior art, in other words operating only in "loop" mode, the following characteristics are obtained:

TABLE 2

| Type of fluid | Liquid yeast | Water |
| --- | --- | --- |
| Viscosity of fluid | 150 cps | 1 cps |
| Length of piping for the fluid | 100 m | 100 m |
| Diameter of piping for the fluid | 26 mm | 26 mm |
| Flow velocity of the fluid | 0.52 m/s | 2 m/s |

TABLE 2-continued

| Type of fluid | Liquid yeast | Water |
| --- | --- | --- |
| Head loss pressure | 4.5 bar | 4.5 bar |
| Flow rate of circulation pump | 1000 l/h | 4000 l/h |

This loop, its piping having a length of 100 m and a diameter of 2.6 mm, the capacity of the piping thus being about 0.53 l/m (liters per meter), will have the disadvantage of causing a potential loss of about 53 liters of liquid yeast, although these are recoverable but at the cost of a recirculation that may unnecessarily warm up the liquid yeast (which may also require an additional exchanger to avoid damaging the liquid yeast by prolonged shear effects), with each facility shutdown lasting several hours, as well as significant heating of the entire volume of liquid yeast which thus remains in the piping for a long time. In addition, this facility requires a circulation pump powerful enough to provide a cleaning water flow rate of about 4000 liters per hour (l/h).

In a facility according to an optional first exemplary implementation according to one embodiment of the invention, in other words able to operate in both "double feeder line" and "loop" modes, we obtain the following characteristics:

TABLE 3

| Type of fluid | Liquid yeast during dispensing | Water | Liquid yeast during recooling |
| --- | --- | --- | --- |
| Viscosity of fluid | 150 cps | 1 cps | 150 cps |
| Length of piping for the fluid | 50 m | 100 m | 100 m |
| Diameter of piping for the fluid | 26 mm | 26 mm | 26 mm |
| Flow velocity of the fluid | 0.26 m/s | 2 m/s | 0.26 m/s |
| Head loss pressure | 1.5 bar | 2.5 bar | 2.5 bar |
| Flow rate of circulation pump | 2 × 500 l/h | 4000 l/h | 500 l/h |

This double feeder line, its piping having a length of 2×50 m (twice 50 m) and a diameter of 26 mm, the capacity of the piping thus being about 0.53 l/m (liters per meter), will have the disadvantage of causing a potential loss of about 53 liters of liquid yeast, although these are recoverable, with each facility shutdown lasting several hours, with smaller head losses enabling the circulation pump to have reduced power despite the same flow rate during cleaning. In addition, this facility requires a circulation pump powerful enough to provide a cleaning water flow rate of about 4000 liters per hour (l/h).

In a facility according to a preferred second exemplary implementation according to another embodiment of the invention, in other words able to operate in both "double feeder line" and "loop" modes, we obtain the following characteristics:

TABLE 4

| Type of fluid | Liquid yeast during dispensing | Water | Liquid yeast during recooling |
| --- | --- | --- | --- |
| Viscosity of fluid | 150 cps | 1 cps | 150 cps |
| Length of piping for the fluid | 50 m | 100 m | 100 m |
| Diameter of piping for the fluid | 19 mm | 19 mm | 19 mm |

TABLE 4-continued

| Type of fluid | Liquid yeast during dispensing | Water | Liquid yeast during recooling |
| --- | --- | --- | --- |
| Flow velocity of the fluid | 0.52 m/s | 2 m/s | 0.24 m/s |
| Head loss pressure | 4 bar | 3 bar | 4 bar |
| Flow rate of circulation pump | 2 × 500 l/h | 2000 l/h | 250 l/h |

This double feeder line, with piping having a length of 2×50 m (twice 50 m) and a diameter of only 19 mm, the capacity of the piping thus being about 0.28 l/m (liters per meter), will have the smaller disadvantage of only causing a potential loss of 26 liters of liquid yeast, although these are recoverable, with each facility shutdown lasing several hours. Furthermore, this facility requires a significantly less powerful circulation pump, as it will only provide a cleaning water flow rate of about 2000 liters per hour (l/h), which also gives a ratio between circulation pump flow rate during cleaning and circulation pump flow rate during dual feeding that is smaller by a factor of 2, thus allowing a much smaller oversizing of the circulation pump than in the various prior arts presented above. It is the supply via double feeder lines that permits the undersizing of the circulation loop (with all the corresponding benefits) while maintaining the desired feed rate.

Of course, the present invention is not limited to the examples and to the embodiment described and shown, but it is capable of numerous variants accessible to those skilled in the art.

The invention claimed is:

1. Method for distributing food fluid in a bakery, comprising a circulation of food fluid, from a cold room to at least one metering point, in supply piping located between the cold room and the at least one metering point, the cold room being remote from the at least one metering point, wherein the supply piping comprises two piping segments and a set of one or more valves arranged so that:
   for a first configuration of the set of one or more valves, the two piping segments supply the at least one metering point with food fluid, in parallel and simultaneously, from at least one tank of food fluid located in the cold room, and
   for a second configuration of the set of one or more valves, the two piping segments form a closed circulation loop for food fluid, passing through the at least one tank of food fluid located in the cold room.

2. Method for distributing food fluid in a bakery according to claim 1, wherein the supply piping is configurable as a circulation loop for non-food fluid.

3. Method for distributing food fluid in a bakery according to claim 2, wherein the non-food fluid has a viscosity of at most 5 centipoise (cps).

4. Method for distributing food fluid in a bakery according to claim 2, wherein the non-food fluid is cleaning water.

5. Method for distributing food fluid in a bakery according to claim 2, wherein the food fluid has a viscosity of at least 50 centipoise (cps).

6. Method for distributing food fluid in a bakery according to claim 1, wherein the food fluid is a leavening agent.

7. Method for distributing food fluid in a bakery according to claim 1, wherein the food fluid is liquid yeast or cream yeast or liquid levain or cream levain.

8. Method for distributing food fluid in a bakery according to claim 1, wherein the two piping segments and the set of one or more valves are arranged in such a way that, for a third configuration of the set of one or more valves, the two piping segments form an open circulation loop for food fluid which returns the food fluid located in the supply piping to the cold room, by pushing it with a fluid.

9. Method for distributing food fluid in a bakery according to claim 8, wherein the two piping segments and the set of one or more valves are arranged in such a way that, for a fourth configuration of the set of one or more valves, the two piping segments form a closed circulation loop for circulating cleaning water.

10. Method for distributing food fluid in a bakery according to claim 9, wherein:
    the two piping segments are interconnected at least:
      at least one bypass supplying the at least one metering point,
      at a branch located downstream of a cleaning water circulation pump having an upstream branch part connected to a cleaning water inlet, and
    the fourth configuration of the set of one or more valves closes off the direction of said branch, for the return portion of the closed circulation loop for cleaning water.

11. Method for distributing food fluid in a bakery according to claim 8, wherein:
    the two piping segments are interconnected at least:
      at least one bypass supplying the at least one metering point,
      at a branch located downstream of a food fluid circulation pump having an upstream branch part connected to the at least one tank located in the cold room, and
    the second configuration of the set of one or more valves and/or the third configuration of the set of one or more valves closes off the direction of said branch, for the return portion of the closed circulation loop and/or for the return portion of the open circulation loop of food fluid towards the cold room.

12. Method for distributing food fluid in a bakery according to claim 11, wherein:
    for the second and/or third configuration of the set of one or more valves, the closed circulation loop and/or the open circulation loop passing through the cold room is formed:
      by opening a first valve connecting a return segment to a piping portion leading to the cold room, and
      by closing a second valve connecting the return segment to the branch.

13. Method for distributing food fluid in a bakery according to claim 11, wherein:
    for the second and/or third configuration of the set of one or more valves, the closed circulation loop and/or the open circulation loop passing through the cold room is formed by changing the state of a three-way valve which:
      opens a passage between a return segment and a piping portion leading to the cold room, and
      closes a passage between the return segment and the branch.

14. Method for distributing food fluid in a bakery according to claim 1, wherein:
    the two piping segments are interconnected at least:
      at least one bypass supplying the at least one metering point,
      at a branch located downstream of a fluid circulation pump but which is not located at said at least one bypass supplying the at least one metering point, and the second configuration of the set of one or more valves closes off the direction of said branch, for the return portion of the fluid circulation loop.

15. Method for distributing food fluid in a bakery according to claim 14, wherein:
a temperature sensor is located at the at least one bypass, and
exceeding of a temperature threshold at said temperature sensor triggers a transition from the first configuration of the set of one or more valves to the second configuration of the set of one or more valves.

16. Method for distributing food fluid in a bakery according to claim 15, wherein the same circulation pump is used to circulate the food fluid and cleaning water in the supply piping.

17. Method for distributing food fluid in a bakery according to claim 16, wherein:
a flow velocity of the food fluid remains below 0.7 m/s,
a flow velocity of the cleaning water remains greater than 1.5 m/s.

18. Method for distributing food fluid in a bakery according to claim 1, wherein the two piping segments are parallel to each other.

19. Method for distributing food fluid in a bakery according to claim 1, wherein the circulation of food fluid comprises only one circulation pump.

20. Method for distributing food fluid in a bakery according to claim 1, wherein, after leaving the cold room, at least a portion of the circulating food fluid is pushed by water or by air in a portion of the supply piping before pouring into the at least one metering point.

21. Method for distributing food fluid in a bakery according to claim 20, wherein:
the circulation of food fluid comprises a circulation pump, and
a water inlet or an air inlet is located just upstream of said circulation pump.

22. Method for distributing food fluid in a bakery according to claim 20, wherein:
the water that pushes the food fluid is at a pressure of at least 2 bar,
and/or the circulating food fluid is at a pressure of at least 2 bar.

23. Method for distributing food fluid in a bakery according to claim 1, wherein:
the circulation of food fluid occurs, from the cold room to at least two metering points, in supply piping located between the cold room and the at least two metering points, the cold room being remote from the at least two metering points,
the two piping segments and the set of one or more valves are arranged in such a way that:
for the first configuration of the set of one or more valves, the two piping segments supply food fluid, in parallel and simultaneously, to plural of the at least two metering points, from the at least one tank of food fluid located in the cold room, and
for at least one other configuration of the set of one or more valves, the two piping segments form a single fluid circulation loop.

24. Method for distributing food fluid in a bakery according to claim 23, wherein the two piping segments are interconnected at least two bypasses supplying the at least two metering points.

25. Method for distributing food fluid in a bakery according to claim 24, wherein:
a temperature sensor is located at one bypass of said at least two bypasses furthest from the cold room, and
exceeding of a temperature threshold at this temperature sensor triggers a transition from the first configuration of the set of one or more valves to the second configuration of the set of one or more valves, the temperature threshold being comprised between 1° C. and 7° C.

26. Method for distributing food fluid in a bakery according to claim 1, wherein the method uses a circulation pump which is a positive displacement pump.

27. Method for distributing food fluid in a bakery according to claim 1, wherein the length of the supply piping between the at least one tank of food fluid in the cold room and the at least one metering point furthest from the cold room is greater than 10 m.

28. Method for distributing food fluid in a bakery according to claim 1, wherein the at least one metering point is at least one mixer.

* * * * *